US009522635B2

(12) United States Patent
Nusbaum

(10) Patent No.: US 9,522,635 B2
(45) Date of Patent: Dec. 20, 2016

(54) BICYCLE CARRIER

(71) Applicant: Neil Nusbaum, Culver City, CA (US)

(72) Inventor: Neil Nusbaum, Culver City, CA (US)

(*) Notice: Subject to any disclaimer, the term of this patent is extended or adjusted under 35 U.S.C. 154(b) by 141 days.

(21) Appl. No.: 14/683,044

(22) Filed: Apr. 9, 2015

(65) Prior Publication Data
US 2015/0210223 A1 Jul. 30, 2015

Related U.S. Application Data

(63) Continuation of application No. 13/668,023, filed on Nov. 2, 2012, now abandoned.

(51) Int. Cl.
B60R 9/10 (2006.01)
B60R 9/06 (2006.01)

(52) U.S. Cl.
CPC .. B60R 9/10 (2013.01); B60R 9/06 (2013.01)

(58) Field of Classification Search
CPC .......... Y10S 224/924; B60R 9/10; B60R 9/06; B60R 9/048
USPC ........................................ 224/497, 572, 924
See application file for complete search history.

(56) References Cited

U.S. PATENT DOCUMENTS

| 3,527,371 | A | 9/1970 | Townsend |
| 3,734,322 | A | 5/1973 | Vaillancourt |
| 3,921,869 | A | 11/1975 | Rogers |
| 4,394,948 | A | 7/1983 | Graber |
| 4,830,250 | A | 5/1989 | Newbold et al. |
| 4,875,608 | A | 10/1989 | Graber |
| 5,118,020 | A | 6/1992 | Piretti |
| 5,211,323 | A | 5/1993 | Chimenti et al. |
| 5,337,932 | A | 8/1994 | Griewahn |
| 5,702,040 | A | 12/1997 | Hedeen |
| 5,826,767 | A | 10/1998 | Chimenti et al. |
| 5,826,769 | A * | 10/1998 | Allen ........................ B60R 9/06 224/314 |
| 5,836,492 | A * | 11/1998 | Allen ........................ B60R 9/06 224/42.26 |
| 5,904,463 | A | 5/1999 | Christensen |
| D447,997 | S | 9/2001 | Ferman et al. |
| 6,286,738 | B1 | 9/2001 | Robins et al. |
| 6,345,748 | B1 | 2/2002 | Chimenti et al. |
| 6,467,664 | B2 | 10/2002 | Robins et al. |
| 6,502,729 | B2 | 1/2003 | Ferman |
| 6,736,301 | B1 | 5/2004 | Huang |
| 6,840,418 | B2 | 1/2005 | Robins et al. |
| 7,165,704 | B2 | 1/2007 | Lo |
| 7,404,504 | B2 | 7/2008 | Settelmayer |

(Continued)

FOREIGN PATENT DOCUMENTS

EP 362082 4/1990

Primary Examiner — Adam Waggenspack
(74) Attorney, Agent, or Firm — Hankin Patent Law, APC; Jimmy Sauz; Kevin Schraven

(57) ABSTRACT

A bicycle carrier. The bicycle carrier may be configured to prevent contact or damage onto vehicle body accessories such as a spoiler or wing. The bicycle carrier may pivotally engage or mount onto the rear end of a vehicle and preferably has a second upper frame, which may be an additional frame extension and may provide the necessary clearance needed over the vehicle body accessory. The second upper frame may attach to the first upper frame or portion of the bicycle carrier and may be adjusted or rotationally positioned. The bicycle carrier may be configured for all vehicle types such as sedans, hatchbacks, and sport utility vehicles.

20 Claims, 7 Drawing Sheets

(56) References Cited

U.S. PATENT DOCUMENTS

| | | |
|---|---|---|
| 7,757,917 B2 | 7/2010 | Bogoslofski et al. |
| D628,141 S * | 11/2010 | Weaver ........................ D12/408 |
| 7,900,801 B2 * | 3/2011 | Huang ...................... B60R 9/10 |
| | | 211/17 |
| D637,137 S | 5/2011 | Weaver et al. |
| 8,025,196 B2 | 9/2011 | Flaherty et al. |
| 8,028,878 B1 | 10/2011 | Pedrini |
| D656,080 S | 3/2012 | Budd et al. |
| D663,675 S | 7/2012 | Sautter et al. |
| 8,235,266 B2 | 8/2012 | Sautter et al. |
| 2006/0138186 A1* | 6/2006 | Pedrini ...................... B60R 9/06 |
| | | 224/497 |
| 2008/0190979 A1 | 8/2008 | Robins et al. |
| 2012/0000951 A1* | 1/2012 | Huang ...................... B60R 9/10 |
| | | 224/501 |
| 2014/0239027 A1* | 8/2014 | Dickinson ................. B60R 9/06 |
| | | 224/534 |

* cited by examiner

BICYCLE CARRIER

This application is a Continuation application of U.S. Non-Provisional patent application Ser. No. 13/668,023, filed on Nov. 2, 2012, titled "Bicycle Carrier", by inventor Neil Nusbaum, the contents of which are expressly incorporated herein by this reference, and to which priority is claimed.

FIELD OF USE

The present disclosure relates generally to vehicle equipment racks adapted to mount to a vehicle, and more particularly, to bicycle carriers that are configured to be mounted to a rear end portion of a vehicle with a vehicle body accessory such as a spoiler or wing.

BACKGROUND

Vehicle equipment racks that are used to transport bicycles on a vehicle are commonly referred to as bicycle carriers or bike racks. The bicycle carrier generally attaches to a vehicle such as a car, sport utility vehicles, van, or bus, and is preferably configured for bicycles to be mounted thereon for transport. Depending on the type of vehicle, the bicycle carrier may attach onto the vehicle's roof, rear trunk, hatch, or rear tow hitch.

One common type of bicycle carrier is the rear mounted bicycle carrier, which is generally configured to attach to the distal end portion of a vehicle. The rear mounted bicycle carriers are typically adjusted to fit various vehicles (e.g., sedans, hatch backs, square backs, mini-vans, sport utility vehicles) and may be installed by utilizing multiple straps with hooks, buckles to adjust the tightness of the straps, and pads to rest against the trunk or rear hatch of the vehicle. The hooks may removeably attach to any conveniently located and structurally sound area, such as the trunk or roof rack cross bar, but are not attached to the vehicle's glass, plastic moldings, spoilers, or fins, due to the material and structural constraints of these parts.

For aesthetic and aerodynamic reasons, some vehicles, usually newer vehicles, may comprise a vehicle body accessory such as a spoiler. Spoilers may cause problems with a bicycle carrier because the bicycle carrier may contact and possibly damage the spoiler. This is especially true because the upper frame of bicycle carriers generally do not provide sufficient clearance over the spoiler to prevent damage on the spoiler.

Additionally, it is generally not recommended to attach the straps and hooks of the bicycle carrier onto the spoiler of the vehicle. While some spoilers may provide attachment points for hooks for the bicycle carrier, most vehicle spoilers generally cannot sustain the weight of the bicycle carrier and bicycles. Additionally, certain types of spoilers may cover the trunk or rear hatch's upper door edge, thereby further preventing a hook attachment at those points. Although the roof rack side rails may be used as alternative attachment points, the straps, along with the weight of the bicycle carrier and bikes, may press down against the spoiler, thereby resulting with possible physical damage to the spoiler.

Therefore, what is needed is a new and improved bicycle carrier that provides clearance over spoilers. Preferably, the new and improved bicycle carrier does not touch or contact the spoiler when the bicycle carrier is attached to the vehicle.

SUMMARY OF EMBODIMENTS

To minimize the limitations in the prior art, and to minimize other limitations that will become apparent upon reading and understanding the present specification, the following discloses a new and improved bicycle carrier that provides clearance over a vehicle body accessory such as a spoiler or wing.

One embodiment may be a bicycle carrier, comprising: a first upper frame; a second upper frame; a lower frame; one or more bicycle support frames; a first pair of adjustment hubs; and a second pair of adjustment hubs; wherein the first upper frame comprises a first pair of arms disposed in parallel and merged at a first base portion, such that the first upper frame is substantially U-shaped; wherein the second upper frame comprises a second pair of arms disposed in parallel and merged at a second base portion, such that the second upper frame is substantially U-shaped; wherein the lower frame comprises a third pair of arms disposed in parallel and merged at a third base portion, such that the lower frame is substantially U-shaped; wherein the one or more bicycle support frames comprise a plurality of fastening members configured to carry one or more bicycles; wherein the one or more bicycle support frames are operatively connected to distal end portions of the third pair of arms of the lower frame via the first pair of adjustment hubs for selective pivoting, such that the one or more bicycle support frames are configured to pivot with respect to the lower frame; wherein distal end portions of the first pair of arms are operatively connected to the distal end portions of the third pair of arms via the first pair of adjustment hubs for selective pivoting, such that the first upper frame is configured to pivot with respect to the lower frame and the one or more bicycle support frames; wherein distal end portions of the second pair of arms are operatively connected to an intermediate portion of the first pair of arms via the second pair of adjustment hubs for selective pivoting, such that the second upper frame is configured to pivot with respect to the first upper frame; wherein the first base portion of the first upper frame is configured for contacting an upper region of a rear end portion of a vehicle; wherein the third base portion of the lower frame is configured for contacting a lower region of the rear end portion of the vehicle; and wherein the second upper frame is configured to selectively pivot relative to the first upper frame, such that the second base portion of the second upper frame is above a vehicle body accessory of the vehicle and the first upper frame and the second upper frame does not contact the vehicle body accessory. The distal end portions of the first pair of arms of the first upper frame may define a first plane and may comprise at least two first bent portions positioned in a direction that is outward and downward out of the first plane to create a second plane; and wherein the second plane may be defined as a proximal portion of the first pair of arms that merge into the first base portion of the first upper frame. The distal end portions of the third pair of arms of the lower frame may define a third plane and may comprise at least two bent portions positioned in a direction that is outward and backward from the third plane to create a fourth plane; and wherein the fourth plane may be defined as a proximal portion of the third pair of arms of the lower frame that merge into the third base portion of the lower frame. The distal end portions of the second pair of arms of the second upper frame may define a fifth plane and may comprise at least two bent portions positioned in a direction that is outward and downward out of the fifth plane to create a sixth plane; and wherein the sixth plane may be defined as a proximal portion of the second pair of arms of the second upper frame that merge into the second base portion of the second upper frame. The bicycle carrier may further comprise one or more upper straps; wherein the one or more upper straps may be configured to fasten the second upper frame to an upper rear portion of the vehicle and may be configured to not contact the vehicle body accessory. The bicycle carrier may further comprise one or more lower straps; wherein the one or more lower straps may be configured to fasten the lower frame to a lower rear portion of the vehicle and may be configured to not contact the vehicle body accessory. The first base portion may comprise one or more cushioning members. The second base portion may comprise one or more cushioning members. The third base portion may comprise one or more cushioning members. The one or more bicycle support frames may be two bicycle support arms.

Another embodiment may be a bicycle carrier, comprising: a first upper frame; a second upper frame, positioned above the first upper frame; a lower frame, positioned below the first upper frame; a bicycle support frame; a first pair of adjustment hubs; a second pair of adjustment hubs; and a third pair of adjustment hubs; wherein the first upper frame comprises a first pair of arms disposed in parallel and merged at a first base portion, such that the first upper frame is substantially U-shaped; wherein the second upper frame comprises a second pair of arms disposed in parallel and merged at a second base portion, such that the second upper frame is substantially U-shaped; wherein the lower frame comprises a third pair of arms disposed in parallel and merged at a third base portion, such that the lower frame is substantially U-shaped; wherein the bicycle support frame comprises a fourth pair of arms disposed in parallel and merged at a fourth base portion, such that the bicycle support frame is substantially U-shaped; wherein the fourth pair of arms of the bicycle support frame comprise a plurality of fastening members configured to carry one or more bicycles; wherein an intermediate portion of the fourth pair of arms of the bicycle support frame are operatively connected to an intermediate portion of the third pair of arms of the lower frame via the first pair of adjustment hubs for selective pivoting, such that the bicycle support frame is configured to pivot along a plane that is substantially horizontal relative to the lower frame; wherein distal end portions of the first pair of arms are operatively connected to distal end portions of the third pair of arms via the second pair of adjustment hubs for selective pivoting, such that the first upper frame is configured to pivot with respect to the lower frame; wherein distal end portions of the second pair of arms are operatively connected to an intermediate portion of the first pair of arms via the third pair of adjustment hubs for selective pivoting, such that the second upper frame is configured to pivot with respect to the first upper frame; wherein the first base portion of the first upper frame is configured for contacting a first upper region of a rear end portion of a vehicle; wherein the second base portion of the second upper frame is configured for contacting a second upper region of the rear end portion of the vehicle; wherein the second upper region is an area that is proximal to the first upper region of the rear end portion of the vehicle; wherein the third base portion of the lower frame is configured for contacting a lower region of the rear end portion of the vehicle; and wherein the second upper frame is configured to selectively pivot relative to the first upper frame, such that the second base portion of the second upper frame is above a vehicle body accessory of the vehicle and the first upper frame and the second upper frame does not contact the vehicle body accessory. The distal end portions of the first pair of arms of the first upper frame may define a first plane and may comprise at least two first bent portions positioned in a direction that is outward and downward out of the first plane to create a second plane; and wherein the second plane may be defined as a proximal portion of the first pair of arms that merge into the first base portion of the first upper frame. The distal end portions of the third pair of arms of the lower frame may define a third plane and may comprise at least two bent portions positioned in a direction that is outwards and backwards from the third plane to create a fourth plane; and wherein the fourth plane may be defined as a proximal portion of the third pair of arms of the lower frame that merge into the third base portion of the lower frame. The distal end portion of the second pair of arms of the second upper frame may define a fifth plane and may comprise at least two bent portions positioned in a direction that is outward and downward out of the fifth plane to create a sixth plane; and wherein the sixth plane may be defined as a proximal portion of the second pair of arms of the second upper frame that merge into the second base portion of the second upper frame. The bicycle carrier may further comprise one or more upper straps; wherein the one or more upper straps may be configured to fasten the second upper frame to an upper rear portion of the vehicle and may be configured to not contact said vehicle body accessory. The bicycle carrier may further comprise one or more lower straps; wherein the one or more lower straps may be configured to fasten the lower frame to a lower rear portion of the vehicle and may be configured to not contact said vehicle body accessory. The bicycle carrier may further comprise one or more side straps; wherein the one or more side straps may be configured to fasten the lower frame to a intermediate rear portion of the vehicle and may be configured to not contact said vehicle body accessory. The first base portion and the third base portion may comprise one or more cushioning members. The second base portion may comprise the one or more cushioning members.

Another embodiment may be a bicycle carrier, consisting essentially of: a first upper frame; a second upper frame, positioned above the first upper frame; a lower frame, positioned below the first upper frame; a bicycle support frame; a first pair of adjustment hubs; a second pair of adjustment hubs; a third pair of adjustment hubs; one or more upper straps; one or more lower straps; and one or more cushioning members; wherein the first upper frame comprises a first pair of arms disposed in parallel and merged at a first base portion, such that the first upper frame is substantially U-shaped; wherein the second upper frame comprises a second pair of arms disposed in parallel and merged at a second base portion, such that the second upper frame is substantially U-shaped; wherein the lower frame comprises a third pair of arms disposed in parallel and merged at a third base portion, such that the lower frame is substantially U-shaped; wherein the bicycle support frame comprises a fourth pair of arms disposed in parallel and merged at a fourth base portion, such that the bicycle support frame is substantially U-shaped; wherein the fourth pair of arms of the bicycle support frame comprise a plurality of fastening members configured to carry one or more bicycles; wherein an intermediate portion of the fourth pair of arms of the bicycle support frame are operatively connected to an intermediate portion of the third pair of arms of the lower frame via the first pair of adjustment hubs for selective pivoting, such that the bicycle support frame is configured to pivot with respect to the lower frame; wherein distal end portions of the first pair of arms are operatively connected to distal end portions of the third pair of arms via the second pair of adjustment hubs for selective pivoting, such that the first upper frame is configured to pivot with respect to the lower frame; wherein distal end portions of the second pair of arms are operatively connected to an intermediate portion of the first pair of arms via the third pair of adjustment hubs for selective pivoting, such that the second upper frame is configured to pivot with respect to the first upper frame; wherein the first base portion of the first upper frame is configured for contacting an upper region of a rear end portion of a vehicle; wherein the third base portion of the lower frame is configured for contacting a lower region of the rear end portion of the vehicle; wherein the second upper frame is configured to selectively pivot relative to the first upper frame, such that the second base portion of the second upper frame is above a vehicle body accessory of the vehicle and the first upper frame and the second upper frame does not contact the vehicle body accessory; wherein the distal end portions of the first pair of arms of the first upper frame define a first plane and comprise at least two first bent portions positioned in a direction that is outward and downward out of the first plane to create a second plane; wherein the second plane is defined as a proximal portion of the first pair of arms that merge into the first base portion of the first upper frame; wherein the distal end portions of the third pair of arms of the lower frame define a third plane and comprise at least two bent portions positioned in a direction that is outwards and backwards from the third plane to create a fourth plane; wherein the fourth plane is defined as a proximal portion of the third pair of arms of the lower frame that merge into the third base portion of the lower frame; wherein the distal end portions of the second pair of arms of the second upper frame define a fifth plane and comprise at least two bent portions positioned in a direction that is outward and downward out of the fifth plane to create a sixth plane; wherein the sixth plane is defined as a proximal portion of the second pair of arms of the second upper frame that merge into the second base portion of the second upper frame; wherein the one or more upper straps are configured to fasten the second upper frame to an upper rear portion of the vehicle and are configured to not contact said vehicle body accessory; wherein the one or more lower straps are configured to fasten the lower frame to a lower rear portion of the vehicle and are configured to not contact said vehicle body accessory; and wherein the first base portion, the second base portion, the third base portion, and the fourth base portion comprise the one or more cushioning members.

It is an object to provide a bicycle carrier that pivotally engages or mounts onto the rear end portion of a vehicle and preferably has a second upper frame (i.e., preferably an additional frame extension), which preferably provides clearance over a vehicle body accessory such as spoiler or wing, such that the bicycle carrier does not contact the vehicle body accessory. The second upper frame may be attached to the first upper frame of the bicycle carrier and may be adjusted, pivoted, or rotationally positioned.

It is an object to provide a second upper frame for a bicycle carrier.

It is an object to provide a bicycle carrier that may collapse or fold for storage when not in use.

It is an object to provide a bicycle carrier that is configured for all vehicle types, including without limitation, sedans, hatchbacks, and sport utility vehicles.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Figure 1:
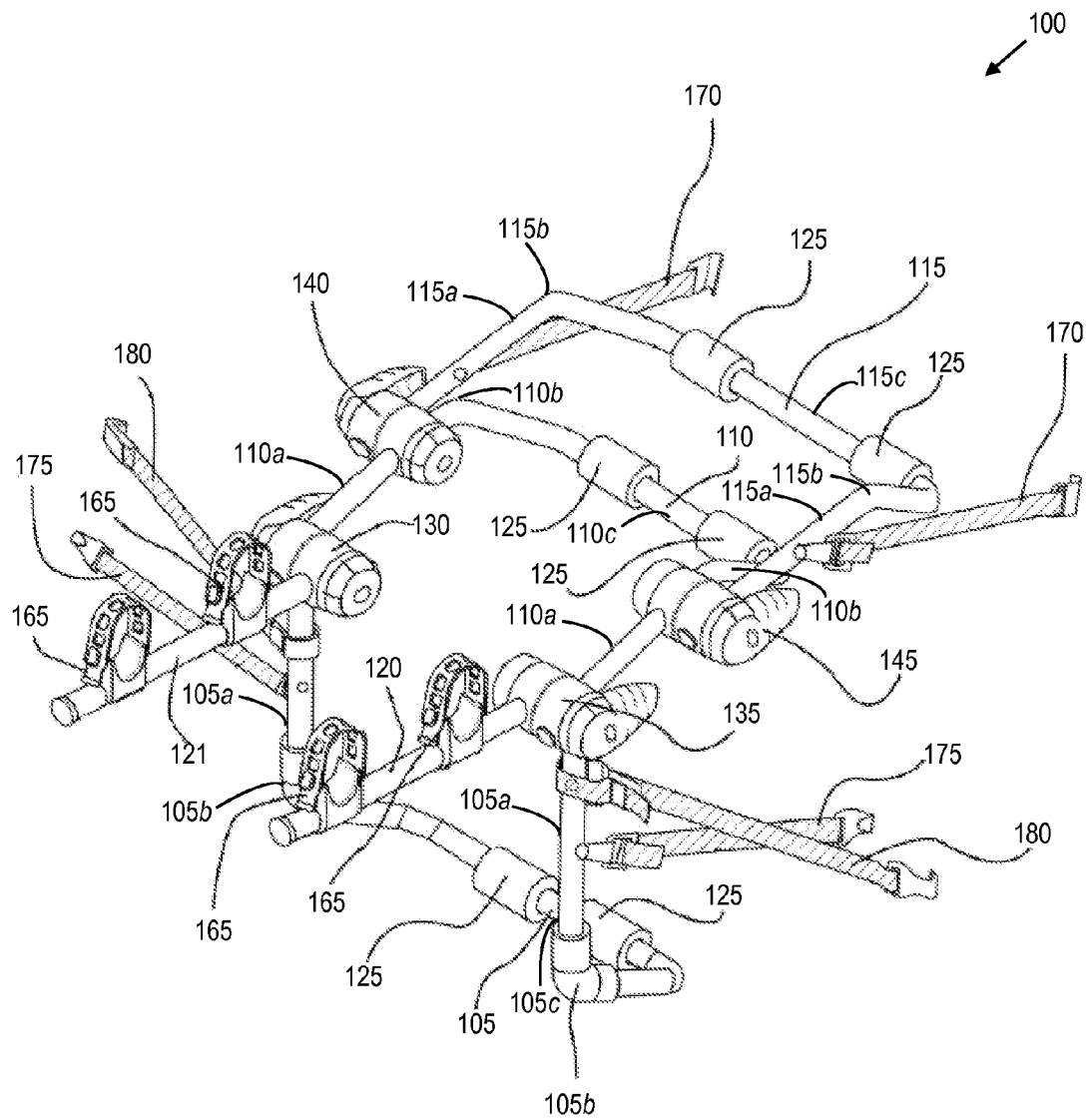
FIG. 1 is an illustration of a perspective view of one embodiment of a bicycle carrier with a second upper frame.

In the following detailed description, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of these embodiments.

While multiple embodiments are disclosed, still other embodiments will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For example, the term "vehicle", as used herein, generally refers to any type of land vehicle or automobile, including without limitation, automobiles, sedans, hatch backs, square backs, vans, mini-vans, sport utility vehicles, hatchbacks, trucks, buses, station wagons, and the like.

As used herein, the term "vehicle body accessory" generally refers to a vehicle's structural and/or non-structural vehicle body accessory that may be located at the rear end portion of the vehicle. Preferably, the vehicle body accessory bulges or projects outwardly or rearwardly from the vehicle and may include, without limitation, spoilers, fins, wings, bumps, antenna, whale tails, duck tails, teatrays, protrusions, and bulges.

As used herein, the terms "second upper frame" or "clearance frame" refer to a frame or section that is preferably substantially U-shaped and may be pivotally connected to the first upper frame of the bicycle carrier. Preferably, the second upper frame is configured not to contact the vehicle body accessory of the vehicle.

The present specification discloses a bicycle carrier with a second upper frame that may be attached to the upper portion or first upper frame of a bicycle carrier. The base portion of the first upper frame may be configured to contact an upper region of a rear end portion of a vehicle, and the base portion of the lower frame may be configured for contacting a lower region of the rear end portion of the vehicle, such that the first upper frame and lower frame engage onto the rear end portion of the vehicle. The pair of arms of the bicycle support frame may be configured to secure one or more bicycles or other items. The second upper frame or clearance frame is preferably an extension frame that is pivotally connected to the first upper frame of the bicycle carrier and may provide rotational mounting or clearance to avoid contact with a vehicle's structural and/or non-structural vehicle body accessory such as a spoiler or wing to prevent damage to that vehicle body accessory. The bicycle carrier may further secure itself onto the vehicle using a system of straps, hooks, and fastening devices. The bicycle carrier may also be used for various types of vehicles such as sedans, hatch backs, and sport utility vehicles and may be foldable or collapsible for storage when not in use.

The second upper frame of the bicycle carrier preferably provides clearance to avoid contact and damage to both non-structural vehicle body accessories (i.e., one or more components attached to the vehicle's body and are removable) and structural vehicle body accessories (i.e., one or more components that are part of the vehicle's body and are generally not removable). For example, conventional bicycle carriers may pull and remove a non-structural vehicle body accessory if the straps of the bicycle carrier attach to the vehicle body accessory. Conventional bicycle carriers may also scratch the paint, dent or damage a structural vehicle body accessory if the straps rub against the vehicle body accessory. As such, the present embodiments provides bicycle carriers with the necessary clearance to both structural and non-structural body accessories to avoid any contact and damage to the vehicle and/or vehicle accessories.

FIG. 1 is an illustration of a perspective view of one embodiment of a bicycle carrier with a second upper frame. As shown in FIG. 1, one embodiment of the bicycle carrier 100 may comprise: a lower frame 105, a first upper frame 110, a second upper frame 115, bicycle support frames 120, 121, cushioning members 125, adjustment hubs 130, 135, 140, 145, fastening members 165, upper straps 170, lower straps 175, and side straps 180. The bicycle support frames 120, 121 may be any structure that is configured to hold, secure, fasten, and/or provide support to one or more bicycles. The bicycle support frames 120, 121 may also be pivotally connected to other body frames, such as the first upper frame 110 and/or lower frame 105 via adjustment hubs 130, 135. In an alternative embodiment, the bicycle support frames 120, 121 may be part of the first upper frame 110, lower frame 105, or second upper frame 115 as a single frame piece.

The first upper frame 110 may be any structure configured to be pivotally connected to the lower frame 105 via a first pair of adjustment hubs 130, 135 and is preferably configured for contacting an upper region of a rear end portion of a vehicle. Specifically, the arms 110a of the first upper frame 110 may be pivotally connected to the arms 105a of the lower frame 105. Thus, in one embodiment, the first upper frame 110 may be U-shaped and may comprise a first pair of arms 110a and one or more cushioning members 125, all of which are preferably configured to protect the vehicle from scratching, denting, and/or other types of damage.

The first upper frame 110 may also comprise a base portion 110c and bent portions 110b, which may allow the arms 110a of the first upper frame 110 to be angular. The angular configuration of the arms 110a of the first upper frame 110 generally allows the base portion 110c of the first upper frame 110 to angle downward toward the upper rear region of a vehicle when the bicycle carrier 100 is mounted or engaged to the rear end portion of the vehicle. The downward angle may also provide angular support of the bicycle carrier 100 when the bicycle carrier 100 is mounted on the vehicle. In a one embodiment, the distal portions of the arms 110a of the first upper frame 110 may define a first plane, and the bent portions 110b may position the proximal portion of the arms 110a and base portion 110c in a direction that is outward and downward away from the first plane to create a second plane. Thus, the second plane may be defined by the proximal portion of the arms 110a as that proximal portion of the arms 110a merge into the base portion 110c of the first upper frame 110. The base portion 110c may be configured to contact an upper rear end portion of the vehicle. Preferably, the base portion 110c of the first upper frame 110 contacts an upper region of the vehicle that is distal to the area contacted by the base portion 115c of the second upper frame 115.

Similarly, the lower frame 105 is generally any structure that is pivotally connected to the first upper frame 110 via a first pair of adjustment hubs 130, 135 and is preferably positioned below the first upper frame 110. Specifically, the arms 105a of the lower frame 105 may be pivotally connected to the arms 110a of the first upper frame 110. The lower frame 105 is generally configured to contact a lower region of said rear end portion of the vehicle such as a bumper and/or lower portion of a trunk lid (frequently the vertical portion of a trunk lid). Like the first upper frame 110, the lower frame 105 may be U-shaped and may comprise a plurality of cushioning members 125, configured to protect the vehicle from any scratches, dents, or damage. Preferably, the first upper frame 110 may be configured to selectively pivot relative to the lower frame 105, such that the first upper frame 110 and the lower frame 105 may better matingly engage the rear end portion of the vehicle.

The lower frame 105 may also comprise a base portion 105c and bent portions 105b, which may allow the arms 105a of the lower frame 105 to be angular. The angular configuration of the arms 105a of the lower frame 105 generally allows the base portion 105c of the lower frame 105 to angle towards the lower rear region of a vehicle when the bicycle carrier 100 is mounted or engaged to the rear end portion of the vehicle. The downward angle may also provide angular support of the bicycle carrier 100 when the bicycle carrier 100 is mounted on the vehicle. In a one embodiment, the distal portions of the arms 105a of the lower frame 105 may define a third plane, and the bent portions 105b may position the proximal portion of the arms 105a and base portion 105c in a direction that is outward and away from the third plane to create a fourth plane. Thus, the fourth plane may be defined as the proximal portion of the arms 105a as that proximal portion of the arms 105a merge into the base portion 105c of the lower frame 105. The base portion 105c may be configured to contact the lower rear end portion of the vehicle.

FIG. 1 shows a second upper frame 115, which is generally any structure that provides the necessary clearance from contacting a vehicle body accessory such as a spoiler or wing. The second upper frame 115 may comprise a pair of arms 115a, which may be pivotally connected to the arms 110a of the first upper frame 110 via a second pair of adjustment hubs 140, 145. In one embodiment, the second upper frame 115 is pivotally connected to the first upper frame 110 as an extension of the first upper frame 110. However, the second upper frame 115 may connected to the bicycle support frames 120, 121 or lower frame 105 as well. Additionally, in an alternative embodiment, the second upper frame 115 may be removable from the bicycle carrier 100 as an add-on extension frame, as opposed to being permanently attached to the bicycle carrier 100. The second upper frame 115 is preferably angular and is preferably U-shaped. Although FIG. 1 shows the clearance frame to be U-shaped, the clearance frame may be constructed or welded into other shapes as well, such as H-shaped, X-shaped, rectangular, or the like.

The second upper frame 115 may also comprise a base portion 115c and bent portions 115b, which may allow the arms 115a of the second upper frame 115 to be angular. The angular configuration of the arms 115a of the second upper frame 115 generally allows the base portion 115c to angle downwards toward another upper rear region of a vehicle when the bicycle carrier 100 is mounted or engaged to the rear end portion of the vehicle. The downward angle may also provide angular support of the bicycle carrier 100 when the bicycle carrier 100 is mounted on the vehicle. In a one embodiment, the distal portions of the arms 115a of the second upper frame 115 may define a fifth plane, and the bent portions 115b may position the proximal portion of the arms 115a and base portion 115c in a direction that is outward and downward away from the fifth plane to create a sixth plane. Thus, the sixth plane may be defined as the proximal portion of the arms 115c, as that proximal portion of the arms 115 merge into the base portion 115c of the second upper frame 115. The base portion 115c may be configured to contact another upper rear end portion of the vehicle. Preferably, the base portion 115c of the second upper frame 115 contacts an upper region of the vehicle that is proximal to the area contacted by the base portion 110c of the first upper frame 110.

Although FIG. 1, shows the first upper frame 110, second upper frame 115, and the lower frame 105 to be substantially U-shaped, the first upper frame 110, second upper frame 115, and lower frame 105 may be configured to be in any type of shape, including without limitation, H-shaped, X-shaped, rectangular, and the like.

Regarding the first pair of adjustment hubs 130, 135, these adjustment hubs 130, 135 are generally any structure configured to connect and/or selectively pivot the first upper frame 110 and lower frame 105. In one embodiment, shown in FIG. 1, the first pair of adjustment hubs 130, 135 may be pivotally connected to the lower frame 105, first upper frame 110, and bicycle support frames 120, 121, such that the lower frame 105, first upper frame 110, and/or bicycle support frames 120, 121 may selectively pivot with respect to one another. The first pair of adjustment hubs 130, 135 may also secure and lock the relative movement of the first upper frame 110 and lower frame 105 and may lock such movement in order to mount or engage onto the rear end portion of the vehicle. For instance, in an embodiment, the first upper frame 110, using adjustment hubs 130, 135, may pivot the lower frame 105 and may lock the lower frame 105 at a certain angle in order to better matingly mount the bicycle carrier 100 onto the trunk of the vehicle.

FIG. 1 also shows straps 170, 175, 180, which are generally one or more pieces flexible material that may be used to fasten, connect, hold, and/or secure the bicycle carrier 100 to the vehicle. The straps 170, 175, 180 may be constructed of any strip of nylon, polypropylene, polyethylene, leather, cloth, or other flexible and strong material, and may include: upper straps 170, lower straps 175, and side straps 180. The upper straps 170, lower straps 175, and side straps 180 may also comprise various types of hook members, which may fasten onto the vehicle's body, such as edges of the trunk lid. Upper straps 170 may be configured to fasten the first upper frame 110 or second upper frame 115 to an upper rear portion of the vehicle such as an upper trunk lid, roof rack, or the like. Lower straps 175 may be configured to fasten the lower frame 105 onto the bottom rear portion of the vehicle such as the bottom edge of a trunk, bumper, body kit, or the like. Side straps 180 may be configured to fasten the first upper frame 110 or lower frame 105 onto any rear portion of the vehicle such as the vehicle's trunk, bumper, roof, roof rack, or the like. Although FIG. 1 shows only three pairs of straps, it should be understood that any number of straps or pairs of straps may be used.

Furthermore, FIG. 1 shows fastening members 165, which are preferably located on the bicycle support frames 120, 121. The fastening members 165 are preferably any device that restrains, holds, and/or secures the bicycles in place on the bicycle support frames 120, 121. The fastening members 165 may be a single piece or multiple pieces, and may be constructed various types of fasteners, including without limitation: hook and loop fasteners, buckles, zippers, snap fasteners, buttons, hooks, pins, curvature, friction, and/or magnets. Although FIG. 1 shows four fastening members 165, the bicycle carrier 100 may have any number of fastening members.

Figure 2:
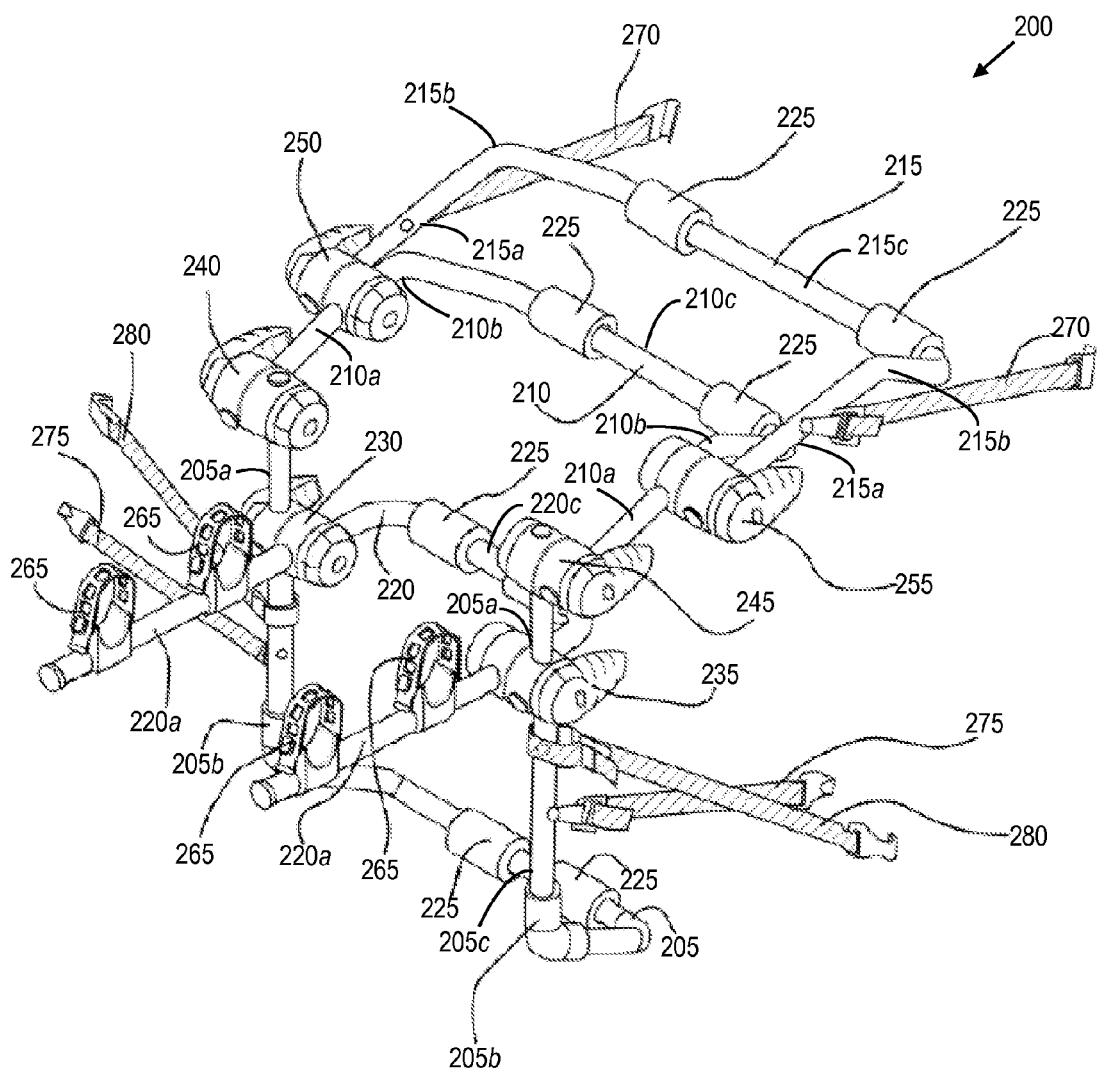
FIG. 2 is an illustration of a perspective view of a preferred embodiment of a bicycle carrier with a second upper frame.

FIG. 2 is an illustration of a perspective view of a preferred embodiment of a bicycle carrier with a second upper frame. As shown in FIG. 2, a preferred embodiment of the bicycle carrier 200 may comprise: a lower frame 205, first upper frame 210, second upper frame 215, bicycle support frame 220, cushioning members 225, adjustment hubs 230, 235, 240, 245, 250, 255, fastening members 265, upper straps 270, lower straps 275, and side straps 280. Unlike the bicycle carrier 100 shown in FIG. 1, the preferred embodiment of the bicycle carrier 200 shown in FIG. 2 preferably comprises a bicycle support frame 220 that is substantially U-shaped and three pairs of adjustment hubs. The bicycle support frame 220 may be any structure that is configured to be pivotally connected to the lower frame 205 via a first pair of adjustment hubs 230, 235 and is preferably configured for holding and securing one or more bicycles. The bicycle support frame 220 typically comprises arms 220a, base portion, 220c and one or more fastening members 265, which are preferably configured to hold and/or secure one or more bicycles onto the bicycle carrier 200. The fastening members 265 may embody a single piece or may comprise as multiple pieces. The fastening members 265 may also comprise various types of fasteners for securing a bicycle onto the bicycle carrier 200, including without limitation: hook and loop fasteners, buckles, zippers, snap fasteners, buttons, hooks, pins, glue, friction, and/or magnets.

The first upper frame 210 is typically any structure configured to be pivotally connected to the lower frame 205 via a second pair of adjustment hubs 240, 245 and is preferably configured for contacting an upper region of a rear end portion of a vehicle. Specifically, the arms 210a of the first upper frame 210 may be pivotally connected to the arms 205a of the lower frame 205. The first upper frame 210 may be substantially U-shaped and may comprise one or more cushioning members 225, which may be configured to protect the vehicle from scratches and other damage.

The first upper frame 210 may also comprise a base portion 210c and bent portions 210b, which may allow the arms 210a of the first upper frame 210 to be angular. The angular configuration of the arms 210a of the first upper frame 210 generally allows the base portion 210c of the first upper frame 210 to angle downward toward the upper rear region of a vehicle when the bicycle carrier 200 is mounted or engaged to the rear end portion of the vehicle. The downward angle may also provide angular support of the bicycle carrier 200 when the bicycle carrier 200 is mounted on the vehicle. In a one embodiment, the distal portions of the arms 210a of the first upper frame 210 may define a first plane, and the bent portions 210b may position the proximal portion of the arms 210a and base portion 210c in a direction that is outward and downward away from the first plane to create a second plane. Thus, the second plane may be defined by the proximal portion of the arms 210a as that proximal portion of the arms 120a merge into the base portion 210c of the first upper frame 210. The base portion 210c may be configured to contact an upper rear end portion of the vehicle. Preferably, the base portion 210c of the first upper frame 210 contacts an upper region of the vehicle that is distal to the area contacted by the base portion 215c of the second upper frame 215.

The lower frame 205 is generally any structure that is pivotally connected to the first upper frame 210 via adjustment hubs 240, 245 and is preferably positioned below the first upper frame 210. Specifically, the arms 205a of the lower frame 205 may be pivotally connected to the arms 210a of the first upper frame 210 via the second pair of adjustment hubs 240, 245. The base portion 205c of the lower frame 205 is generally configured to contact a lower region of said rear end portion of the vehicle such as a bumper and/or lower portion of a trunk lid. Like the upper frame 210, the lower frame 205 may be U-shaped and may comprise a plurality of cushioning members 225, configured to protect the vehicle from any scratches, dents, or damage Importantly, the first upper frame 210 may be configured to selectively pivot relative to the lower frame 205, such that the first upper frame 110 and the lower frame 205 may better matingly mount or engage the rear end portion of the vehicle.

The lower frame 205 may also comprise a base portion 205c and bent portions 205b, which may allow the arms 205a of the lower frame 205 to be angular. The angular configuration of the arms 205a of the lower frame 205 generally allows the base portion 210c of the lower frame 205 to angle towards the lower rear region of a vehicle when the bicycle carrier 200 is mounted or engaged to the rear end portion of the vehicle. The downward angle may also provide angular support of the bicycle carrier 200 when the bicycle carrier 200 is mounted on the vehicle. In a one embodiment, the distal portions of the arms 205a of the lower frame 205 may define a third plane, and the bent portions 205b may position the proximal portion of the arms 205a and base portion 205c in a direction that is outward and away from the third plane to create a fourth plane. Thus, the fourth plane may be defined as the proximal portion of the arms 205a as that proximal portion of the arms 205a merge into the base portion 205c of the lower frame 205. The base portion 205c may be configured to contact the lower rear end portion of the vehicle.

FIG. 2 shows a second upper frame 215, which is generally any structure that provides the necessary clearance from contacting a vehicle body accessory such as a spoiler or wing. The second upper frame 215 may comprise a pair of arms 215a, which may be pivotally connected to the arms 210a of the first upper frame 210 via the third pair of adjustment hubs 250, 255. In one embodiment, the second upper frame 215 is pivotally connected to the first upper frame 210 as an extension of the first upper frame 210. However, in other embodiments, the second upper frame 215 may connected to the bicycle support frames 220, or lower frame 205 as well. Additionally, in an alternative embodiment, the second upper frame 215 may be removable from the bicycle carrier 200 as an add-on or added extension frame, as opposed to being permanently attached to the bicycle carrier 200. The second upper frame 215 is preferably angular and is preferably U-shaped. Although FIG. 2 shows the clearance frame or second upper frame 215 to be U-shaped, the clearance frame may be constructed or welded into other shapes as well, such as H-shaped, X-shaped, rectangular, or the like.

The second upper frame 215 may also comprise a base portion 215c and bent portions 215b, which may allow the arms 215a of the second upper frame 215 to be angular. The angular configuration of the arms 215a of the second upper frame 215 generally allows the base portion 215c to angle downwards toward another upper rear region of a vehicle when the bicycle carrier 200 is mounted or engaged to the rear end portion of the vehicle. The downward angle may also provide angular support of the bicycle carrier 200 when the bicycle carrier 200 is mounted on the vehicle. In a one embodiment, the distal portions of the arms 215a of the second upper frame 215 may define a fifth plane, and the bent portions 215b may position the proximal portion of the arms 215a and base portion 215c in a direction that is outward and downward away from the fifth plane to create a sixth plane. Thus, the sixth plane may be defined as the proximal portion of the arms 215c, as that proximal portion of the arms 215 merge into the base portion 215c of the second upper frame 215. The base portion 215c may be configured to contact another upper rear end portion of the vehicle. Preferably, the base portion 215c of the second upper frame 215 contacts an upper region of the vehicle that is proximal to the area contacted by the base portion 210c of the first upper frame 210.

Regarding the straps 270, 275, 280, the straps 270, 275, 280 of the bicycle carrier 200 are typically used to fasten, connect, hold, and/or secure the bicycle carrier 200 to the vehicle. The straps 270, 275, 280 may include: upper straps 270, lower straps 275, and side straps 280 and may be constructed any flexible and strong material such as leather, cloth, or fabric material. Like the bicycle carrier 200 shown in FIG. 2, the straps 270, 275, 280 may comprise hook members, which preferably fasten onto the vehicle's body, such as edges of the trunk lid. The lower straps 275 may fasten onto the lower portion of the vehicle's trunk lid; the upper straps 270 may fasten onto the upper portion of the vehicle's trunk lid; and the side straps 280 may fasten onto the side portions of the vehicle's trunk lid. Although FIG. 2 shows only three pairs of straps, it should be understood that any number of straps or pairs of straps may be used.

FIG. 2 also shows that the bicycle carrier 200 may comprise adjustment hubs 230, 235, 240, 245, 250, 255, which are preferably any structure configured to connect and selectively pivot the bicycle support frame 220, first upper frame 210, second upper frame 215, and lower frame 205 relative to each other. For example, bicycle support frame 220 may be connected to the lower frame 205 via the first pair of adjustment hubs 230, 235 and may pivot relative to the lower frame 205. Similarly, the first upper frame 210 may be connected to the lower frame 205 by the second pair of adjustment hubs 240, 245 and may pivot relative to the lower frame 205. The second upper frame 215 may be connected to the first upper frame 210 via the third pair of adjustment hubs 250, 255 and may pivot relative to the first upper frame 210. The adjustment hubs 230, 235, 240, 245, 250, 255 may secure and lock the relative movement of the lower frame 205, first upper frame 210, second upper frame 215, and bicycle support frame 220, and may lock such movement in order to mount or engage onto a rear end portion of the vehicle.

Figure 3:
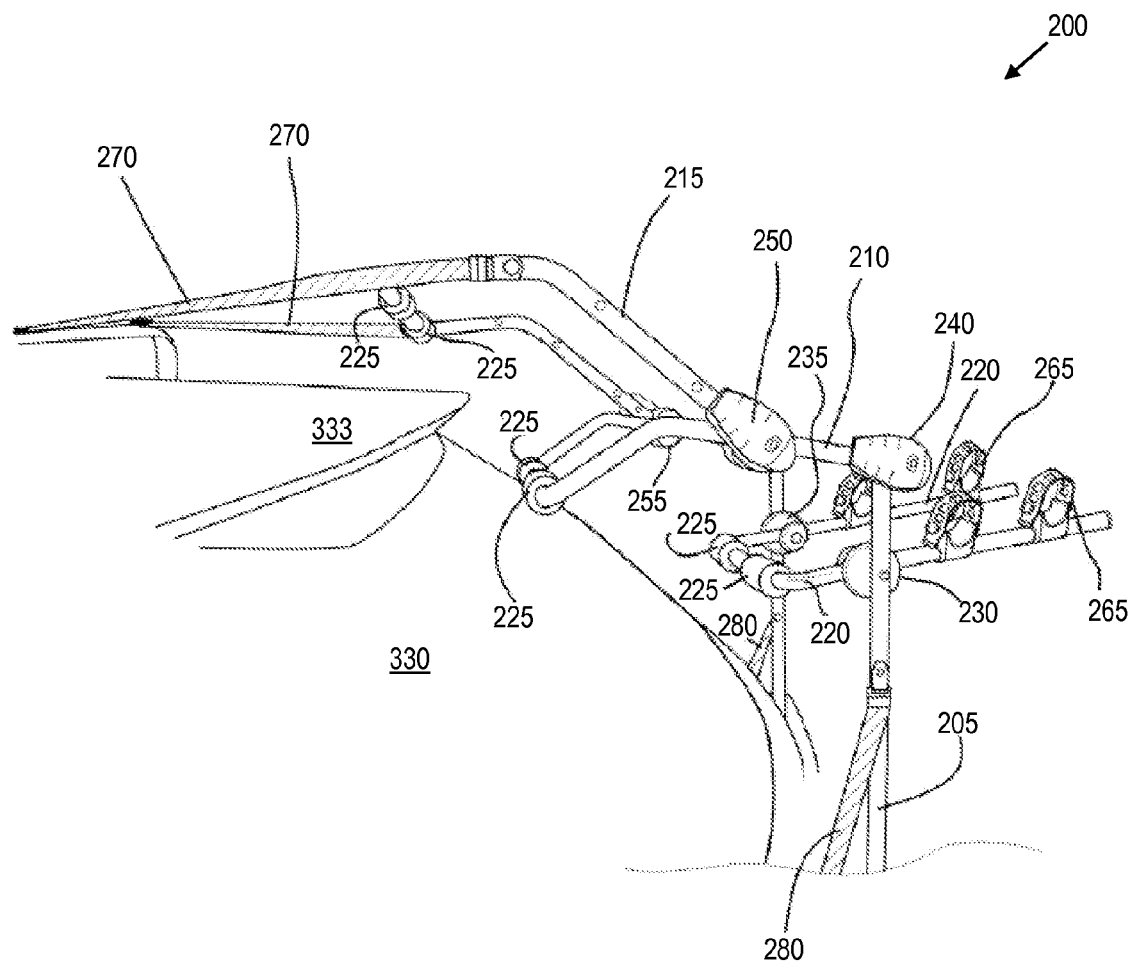
FIG. 3 is an illustration of a side-perspective view of a preferred embodiment of the bicycle carrier and shows the bicycle carrier mounted onto a rear end portion of a vehicle having a vehicle body accessory.

FIG. 3 is an illustration of a side-perspective view of a preferred embodiment of the bicycle carrier and shows the bicycle carrier mounted onto a rear end portion of a vehicle having a vehicle body accessory. As shown in FIG. 3, one embodiment of the bicycle carrier 200 may comprise: a lower frame 205, first upper frame 210, second upper frame 215, bicycle support frame 220, upper straps 270, lower straps 280, cushioning members 225, adjustment hubs 230, 235, 240, 250, 255; and fastening members 265. FIG. 3 shows that the base 210c of the first upper frame 210 may pivot and press against an upper rear region of the vehicle 330, which, as shown, may be a rear window. The lower frame 205 may be secured against the rear portion of the vehicle 330 by fastening the lower straps 280 to a lower portion of the vehicle. The second upper frame 215 may be pivotally connected to the first upper frame 210 and may be above or suspended over the vehicle body accessory 333 of the vehicle 330. Upper straps 270 may be connected to the second upper frame 215 and may be used to securely fasten the upper portion of the bicycle carrier 200 to the rear roof portion of the vehicle 330. Although FIG. 3 shows no contact between the second upper frame 215 and the vehicle, it should be understood that the second upper frame 215 may be configured to contact other upper rear end portions of the vehicle such as the roof, rear window, or trunk, but preferably does not contact the vehicle body accessory 333. The second upper frame 215 may also mounted to the vehicle 330 without any portion of the bicycle carrier 200 contacting the vehicle body accessory 333. A loose end, as opposed to a taut and engaged strap, from one of the straps 270, 280 does not constitute contact with the vehicle body accessory 333, as the object of the second upper frame is to enable a bicycle carrier to engage with a vehicle without damaging the vehicle body accessory 333 by making contact from a frame portion or in use strap portion.

Figure 4:
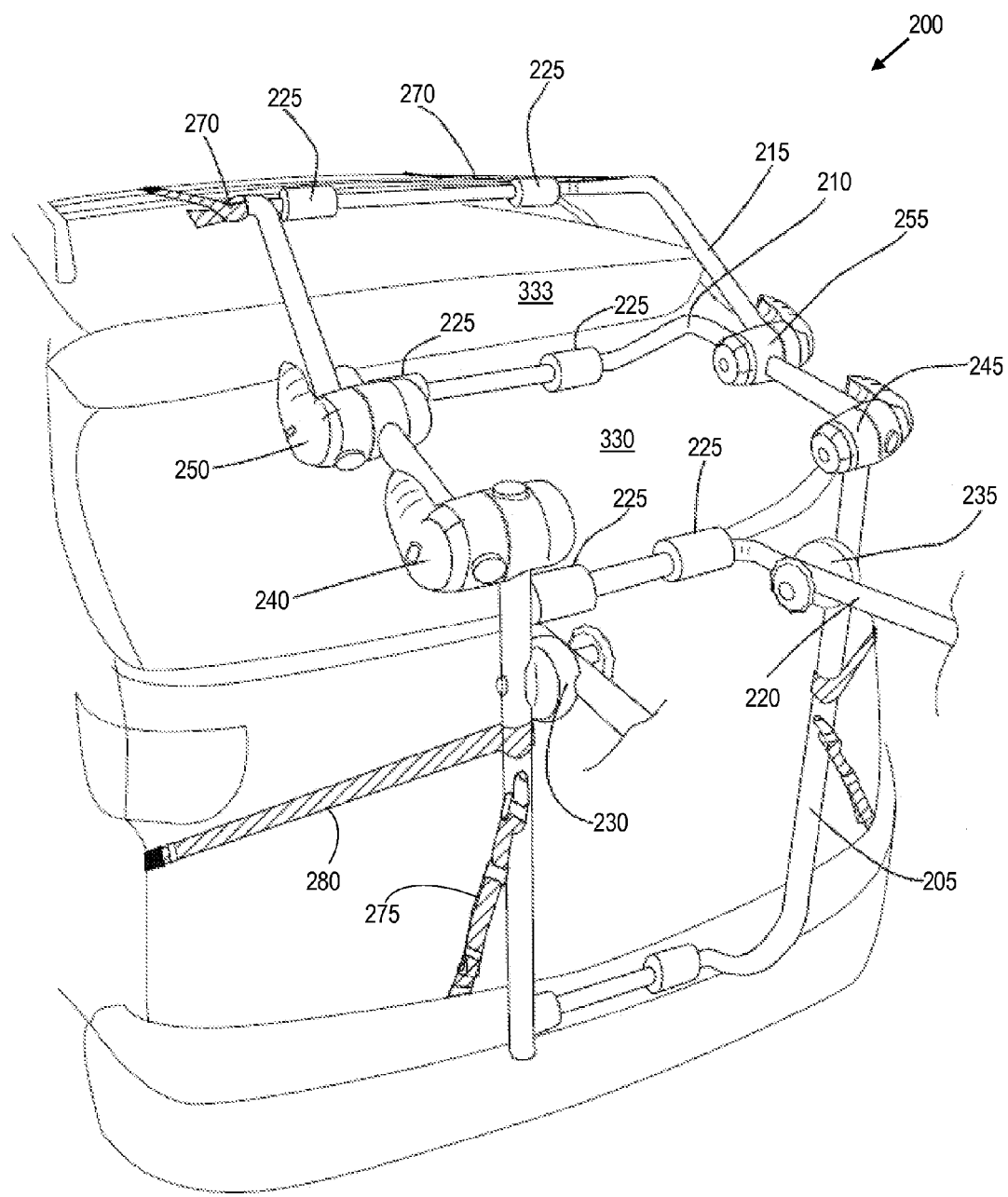
FIG. 4 is an illustration of a rear-perspective view of a preferred embodiment of the bicycle carrier and shows the bicycle carrier mounted onto a rear end portion of a vehicle having a vehicle body accessory.

FIG. 4 is an illustration of a rear-perspective view of a preferred embodiment of the bicycle carrier and shows the bicycle carrier mounted onto a rear end portion of a vehicle having a vehicle body accessory. As shown in FIG. 4, one embodiment of the bicycle carrier 200 may comprise: a lower frame 205, a first upper frame 210, a second upper frame 215, a bicycle support frame 220, upper straps 270, side straps 280, lower straps 275, cushioning members 225, and adjustment hubs 230, 235, 240, 245, 250, 255. The second upper frame 215 may be angular (or angled), in order to provide clearance to vehicle body accessory 333 of the vehicle 330. Cushioning members 225 may also contact the vehicle 330 to prevent scratching to the vehicle 330. FIG. 4 shows how the use of the adjustment hubs 230, 235, 240, 245, 250, 255 would allow a user to angle the various frames in relation to each other to be able to fit various vehicle body types in a snug and mating fashion.

Figure 5:
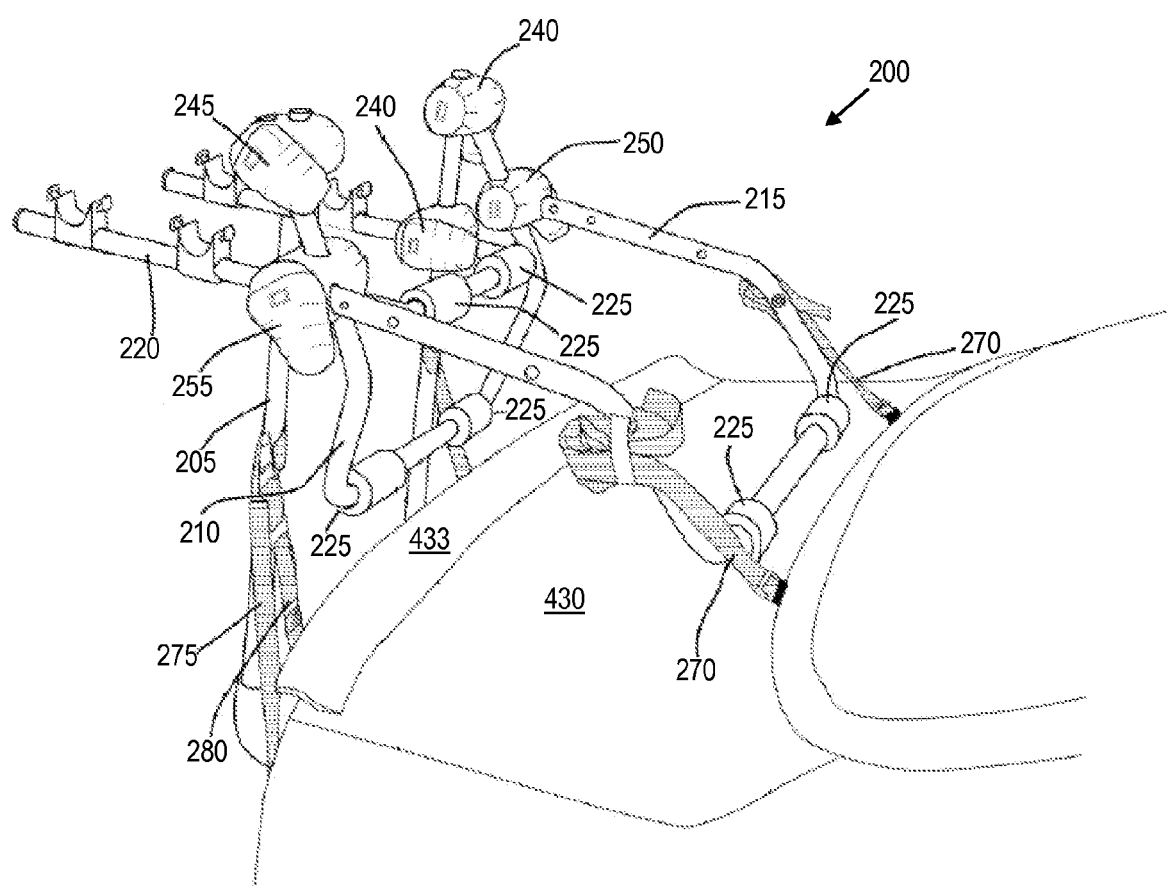
FIG. 5 is an illustration of a side-perspective view of a preferred embodiment of the bicycle carrier and shows the bicycle carrier mounted onto a sedan with a vehicle body accessory.

FIG. 5 is an illustration of a perspective view of a preferred embodiment of the bicycle carrier and shows the bicycle carrier mounted onto a sedan with a vehicle body accessory. As shown in FIG. 5, a preferred embodiment of the bicycle carrier 200 may comprise: a lower frame 205, a first upper frame 210, second upper frame 215, bicycle support frame 220, upper straps 270, lower straps 275, side straps 280, cushioning members 225, and adjustment hubs 230, 235, 240, 245, 250, 255. To avoid contact with a vehicle body accessory 433 on a sedan 430 such as a spoiler, the first upper frame 210 may fold or collapse, via the adjustment hubs, towards the lower frame 205. FIG. 5 also shows that without the second upper frame 215, the bicycle carrier 200 cannot mount onto the sedan 430 without causing damage because the first upper frame 210 would contact the vehicle body accessory 433 and very likely damage the vehicle body accessory 433, or be prevented from mounting securely on the vehicle 430. The first upper frame 205 and lower frame 210 may be folded, such that both first upper frame 210 and lower frame 205 may be close to each other. This may be achieved by selectively positioning the adjustment hubs to rotate or pivot the first upper frame 210 towards the lower frame 205. The distal portion of the second upper frame 215 may contact the upper surface of the vehicle 430, such as the trunk, rear glass window, or roof. The upper straps 270, side straps 280, and lower straps 275 may tighten and secure the bicycle carrier 200 onto the vehicle 430 by fastening the bicycle carrier 200 at portions of the vehicle 430 such as edges of the trunk, roof, bumper, and windows. The arm portions of the bicycle support frame 220 may protrude rearward, such that one or more bicycles may be strapped or secured onto the arm portions of the bicycle carrier 200. Although FIG. 5 shows the arm portions protruding outwards and rearwards, the arm portions of the bicycle support frame 220 may protrude in other directions, such as upwards or downwards. Additionally, although FIG. 5 shows the bicycle carrier with straps, an alternative embodiment of the bicycle carrier may be configured without straps.

Figure 6:
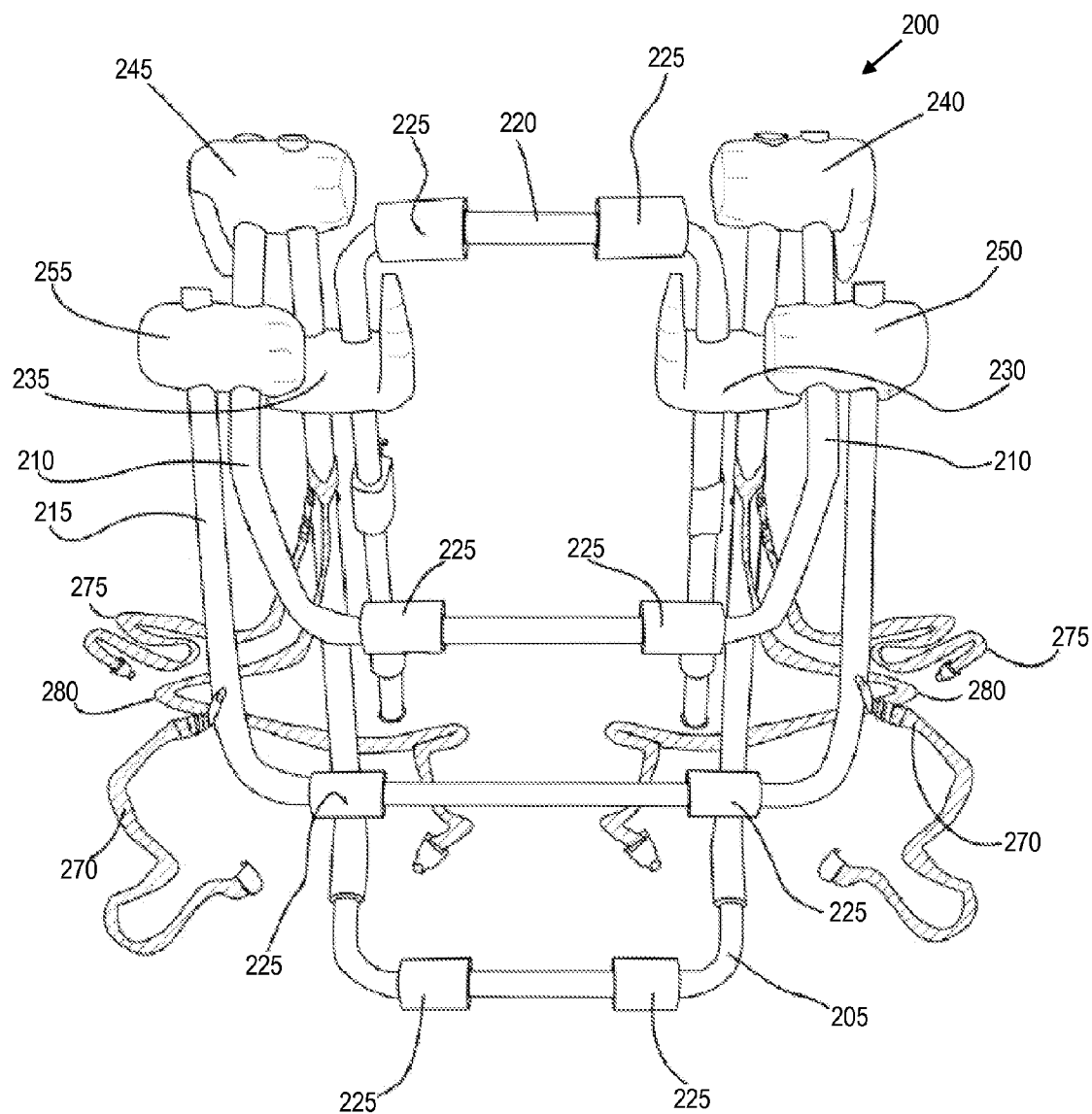
FIG. 6 is an illustration of a front view of a preferred embodiment of the bicycle carrier and shows the bicycle carrier folded for storage.

FIG. 6 is an illustration of a front view of a preferred embodiment of the bicycle carrier and shows the bicycle carrier folded for storage. As shown in FIG. 6, a preferred embodiment of the bicycle carrier 200 may comprise: a lower frame 205, a first upper frame 210, a second upper frame 215, bicycle support frame 220, cushioning members 225, adjustment hubs 230, 235, 240, 245, 250, 255, upper straps 270, lower straps 275, and side straps 280. The first pair of adjustment hubs 230, 235 may pivot and rotate the bicycle support frame 220, such that the arm portions of the bicycle support frame 220 are substantially parallel to the arm portions of the lower frame 205. Similarly, the second pair of adjustment hubs 240, 245 may pivot and rotate the first upper frame 210, such that the first upper frame 210 and lower frame 205 are substantially close and parallel to one another. The third pair of adjustment hubs 250, 255 may pivot and rotate the second upper frame 215, such that the first upper frame 210 and second upper frame 215 are substantially parallel to one another. The upper straps 270, lower straps 275, and side straps 280 may also be tied to prevent entanglement for storage use.

Figure 7:
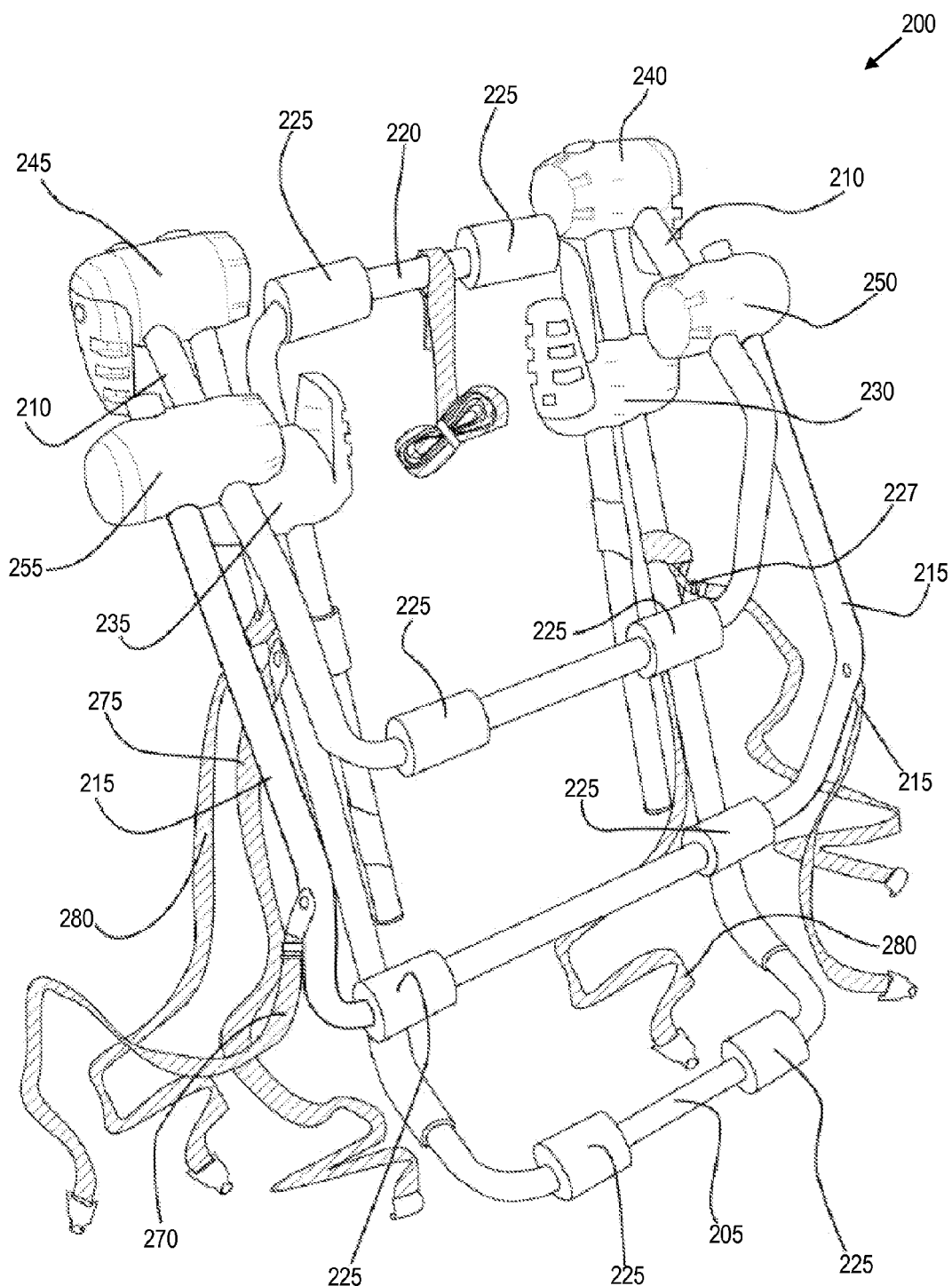
FIG. 7 is an illustration of a perspective view of one embodiment of the bicycle carrier and shows the bicycle carrier folded for storage.

FIG. 7 is an illustration of a perspective view of one embodiment of the bicycle carrier and shows the bicycle carrier folded for storage. As shown in FIG. 7, one embodiment of the bicycle carrier 200 may comprise: a lower frame 205, a first upper frame 210, a second upper frame 215, bicycle support frame 220, cushioning members 225, adjustment hubs 230, 235, 240, 245, 250, 255, upper straps 270, lower straps 275, and side straps 280.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the embodiments have been presented for the purposes of illustration and description. While multiple embodiments are disclosed, still other embodiments will become apparent to those skilled in the art from the above detailed description. As will be realized, the embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A bicycle carrier, comprising:
a first upper frame;
a second upper frame;
a lower frame;
one or more bicycle support frames;
a first pair of adjustment hubs; and
a second pair of adjustment hubs;
wherein said first upper frame comprises a first pair of arms disposed in parallel and merged at a first base portion, such that said first upper frame is substantially U-shaped;
wherein said second upper frame comprises a second pair of arms disposed in parallel and merged at a second base portion, such that said second upper frame is substantially U-shaped;
wherein said lower frame comprises a third pair of arms disposed in parallel and merged at a third base portion, such that said lower frame is substantially U-shaped;
wherein said one or more bicycle support frames comprise a plurality of fastening members configured to carry one or more bicycles;
wherein said one or more bicycle support frames are operatively connected to distal end portions of said third pair of arms of said lower frame via said first pair of adjustment hubs for selective pivoting, such that said one or more bicycle support frames are configured to pivot with respect to said lower frame;
wherein distal end portions of said first pair of arms are operatively connected to said distal end portions of said third pair of arms via said first pair of adjustment hubs for selective pivoting, such that said first upper frame is configured to pivot with respect to said lower frame and said one or more bicycle support frames;
wherein distal end portions of said second pair of arms are operatively connected to an intermediate portion of said first pair of arms via said second pair of adjustment hubs for selective pivoting, such that said second upper frame is configured to pivot with respect to said first upper frame;
wherein said first base portion of said first upper frame is configured for contacting an upper region of a rear end portion of a vehicle;
wherein said third base portion of said lower frame is configured for contacting a lower region of said rear end portion of said vehicle; and
wherein said second upper frame is configured to selectively pivot relative to said first upper frame, such that said second base portion of said second upper frame is above a vehicle body accessory of said vehicle and said first upper frame and said second upper frame does not contact said vehicle body accessory.

2. The bicycle carrier according to claim 1, wherein said distal end portions of said first pair of arms of said first upper frame define a first plane and comprise at least two first bent portions positioned in a direction that is outward and downward out of said first plane to create a second plane; and
wherein said second plane is defined as a proximal portion of said first pair of arms that merge into said first base portion of said first upper frame.

3. The bicycle carrier according to claim 2, wherein said distal end portions of said third pair of arms of said lower frame define a third plane and comprise at least two bent portions positioned in a direction that is outward and backward from said third plane to create a fourth plane; and
wherein said fourth plane is defined as a proximal portion of said third pair of arms of said lower frame that merge into said third base portion of said lower frame.

4. The bicycle carrier according to claim 3, wherein said distal end portions of said second pair of arms of said second upper frame define a fifth plane and comprise at least two bent portions positioned in a direction that is outward and downward out of said fifth plane to create a sixth plane; and
wherein said sixth plane is defined as a proximal portion of said second pair of arms of said second upper frame that merge into said second base portion of said second upper frame.

5. The bicycle carrier according to claim 1, further comprising one or more upper straps;
wherein said one or more upper straps are configured to fasten said second upper frame to an upper rear portion of said vehicle and are configured to not contact said vehicle body accessory.

6. The bicycle carrier according to claim 5, further comprising one or more lower straps;
wherein said one or more lower straps are configured to fasten said lower frame to a lower rear portion of said vehicle and are configured to not contact said vehicle body accessory.

7. The bicycle carrier according to claim 1, wherein said first base portion comprises one or more cushioning members.

8. The bicycle carrier according to claim 1, wherein said second base portion comprises one or more cushioning members.

9. The bicycle carrier according to claim 1, wherein said third base portion comprises one or more cushioning members.

10. The bicycle carrier according to claim 1, wherein said one or more bicycle support frames are two bicycle support arms.

11. A bicycle carrier, comprising:
a first upper frame;
a second upper frame, positioned above said first upper frame;

a lower frame, positioned below said first upper frame;
a bicycle support frame;
a first pair of adjustment hubs;
a second pair of adjustment hubs; and
a third pair of adjustment hubs;
wherein said first upper frame comprises a first pair of arms disposed in parallel and merged at a first base portion, such that said first upper frame is substantially U-shaped;
wherein said second upper frame comprises a second pair of arms disposed in parallel and merged at a second base portion, such that said second upper frame is substantially U-shaped;
wherein said lower frame comprises a third pair of arms disposed in parallel and merged at a third base portion, such that said lower frame is substantially U-shaped;
wherein said bicycle support frame comprises a fourth pair of arms disposed in parallel and merged at a fourth base portion, such that said bicycle support frame is substantially U-shaped;
wherein said fourth pair of arms of said bicycle support frame comprise a plurality of fastening members configured to carry one or more bicycles;
wherein an intermediate portion of said fourth pair of arms of said bicycle support frame are operatively connected to an intermediate portion of said third pair of arms of said lower frame via said first pair of adjustment hubs for selective pivoting, such that said bicycle support frame is configured to pivot along a plane that is substantially horizontal relative to said lower frame;
wherein distal end portions of said first pair of arms are operatively connected to distal end portions of said third pair of arms via said second pair of adjustment hubs for selective pivoting, such that said first upper frame is configured to pivot with respect to said lower frame;
wherein distal end portions of said second pair of arms are operatively connected to an intermediate portion of said first pair of arms via said third pair of adjustment hubs for selective pivoting, such that said second upper frame is configured to pivot with respect to said first upper frame;
wherein said first base portion of said first upper frame is configured for contacting a first upper region of a rear end portion of a vehicle;
wherein said second base portion of said second upper frame is configured for contacting a second upper region of said rear end portion of said vehicle;
wherein said second upper region is an area that is proximal to said first upper region of said rear end portion of said vehicle;
wherein said third base portion of said lower frame is configured for contacting a lower region of said rear end portion of said vehicle; and
wherein said second upper frame is configured to selectively pivot relative to said first upper frame, such that said second base portion of said second upper frame is above a vehicle body accessory of said vehicle and said first upper frame and said second upper frame does not contact said vehicle body accessory.

12. The bicycle carrier according to claim 11, wherein said distal end portions of said first pair of arms of said first upper frame define a first plane and comprise at least two first bent portions positioned in a direction that is outward and downward out of said first plane to create a second plane; and wherein said second plane is defined as a proximal portion of said first pair of arms that merge into said first base portion of said first upper frame.

13. The bicycle carrier according to claim 12, wherein said distal end portions of said third pair of arms of said lower frame define a third plane and comprise at least two bent portions positioned in a direction that is outwards and backwards from said third plane to create a fourth plane; and wherein said fourth plane is defined as a proximal portion of said third pair of arms of said lower frame that merge into said third base portion of said lower frame.

14. The bicycle carrier according to claim 13, wherein said distal end portion of said second pair of arms of said second upper frame define a fifth plane and comprise at least two bent portions positioned in a direction that is outward and downward out of said fifth plane to create a sixth plane; and wherein said sixth plane is defined as a proximal portion of said second pair of arms of said second upper frame that merge into said second base portion of said second upper frame.

15. The bicycle carrier according to claim 11, further comprising one or more upper straps;

wherein said one or more upper straps are configured to fasten said second upper frame to an upper rear portion of said vehicle and are configured to not contact said vehicle body accessory.

16. The bicycle carrier according to claim 12, further comprising one or more lower straps;

wherein said one or more lower straps are configured to fasten said lower frame to a lower rear portion of said vehicle and are configured to not contact said vehicle body accessory.

17. The bicycle carrier according to claim 13, further comprising one or more side straps;

wherein said one or more side straps are configured to fasten said lower frame to a intermediate rear portion of said vehicle and are configured to not contact said vehicle body accessory.

18. The bicycle carrier according to claim 17, wherein said first base portion and said third base portion comprises one or more cushioning members.

19. The bicycle carrier according to claim 18, wherein said second base portion comprises said one or more cushioning members.

20. A bicycle carrier, consisting essentially of:
a first upper frame;
a second upper frame, positioned above said first upper frame;
a lower frame, positioned below said first upper frame;
a bicycle support frame;
a first pair of adjustment hubs;
a second pair of adjustment hubs;
a third pair of adjustment hubs;
one or more upper straps;
one or more lower straps; and
one or more cushioning members;
wherein said first upper frame comprises a first pair of arms disposed in parallel and merged at a first base portion, such that said first upper frame is substantially U-shaped;
wherein said second upper frame comprises a second pair of arms disposed in parallel and merged at a second base portion, such that said second upper frame is substantially U-shaped;

wherein said lower frame comprises a third pair of arms disposed in parallel and merged at a third base portion, such that said lower frame is substantially U-shaped;

wherein said bicycle support frame comprises a fourth pair of arms disposed in parallel and merged at a fourth base portion, such that said bicycle support frame is substantially U-shaped;

wherein said fourth pair of arms of said bicycle support frame comprise a plurality of fastening members configured to carry one or more bicycles;

wherein an intermediate portion of said fourth pair of arms of said bicycle support frame are operatively connected to an intermediate portion of said third pair of arms of said lower frame via said first pair of adjustment hubs for selective pivoting, such that said bicycle support frame is configured to pivot with respect to said lower frame;

wherein distal end portions of said first pair of arms are operatively connected to distal end portions of said third pair of arms via said second pair of adjustment hubs for selective pivoting, such that said first upper frame is configured to pivot with respect to said lower frame;

wherein distal end portions of said second pair of arms are operatively connected to an intermediate portion of said first pair of arms via said third pair of adjustment hubs for selective pivoting, such that said second upper frame is configured to pivot with respect to said first upper frame;

wherein said first base portion of said first upper frame is configured for contacting an upper region of a rear end portion of a vehicle;

wherein said third base portion of said lower frame is configured for contacting a lower region of said rear end portion of said vehicle;

wherein said second upper frame is configured to selectively pivot relative to said first upper frame, such that said second base portion of said second upper frame is above a vehicle body accessory of said vehicle and said first upper frame and said second upper frame does not contact said vehicle body accessory;

wherein said distal end portions of said first pair of arms of said first upper frame define a first plane and comprise at least two first bent portions positioned in a direction that is outward and downward out of said first plane to create a second plane;

wherein said second plane is defined as a proximal portion of said first pair of arms that merge into said first base portion of said first upper frame;

wherein said distal end portions of said third pair of arms of said lower frame define a third plane and comprise at least two bent portions positioned in a direction that is outwards and backwards from said third plane to create a fourth plane;

wherein said fourth plane is defined as a proximal portion of said third pair of arms of said lower frame that merge into said third base portion of said lower frame;

wherein said distal end portions of said second pair of arms of said second upper frame define a fifth plane and comprise at least two bent portions positioned in a direction that is outward and downward out of said fifth plane to create a sixth plane;

wherein said sixth plane is defined as a proximal portion of said second pair of arms of said second upper frame that merge into said second base portion of said second upper frame;

wherein said one or more upper straps are configured to fasten said second upper frame to an upper rear portion of said vehicle and are configured to not contact said vehicle body accessory;

wherein said one or more lower straps are configured to fasten said lower frame to a lower rear portion of said vehicle and are configured to not contact said vehicle body accessory; and wherein said first base portion, said second base portion, said third base portion, and said fourth base portion comprise said one or more cushioning members.

* * * * *